(12) United States Patent
Wada

(10) Patent No.: US 7,755,846 B2
(45) Date of Patent: Jul. 13, 2010

(54) ZOOM LENS AND IMAGE PICKUP APPARATUS INCLUDING THE SAME

(75) Inventor: Ken Wada, Shioya-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 12/251,241

(22) Filed: Oct. 14, 2008

(65) Prior Publication Data

US 2009/0103188 A1 Apr. 23, 2009

(30) Foreign Application Priority Data

Oct. 19, 2007 (JP) .............................. 2007-272053

(51) Int. Cl.
*G02B 15/14* (2006.01)

(52) U.S. Cl. ...................................... 359/688; 359/686

(58) Field of Classification Search ................. 359/684, 359/685, 686, 688
See application file for complete search history.

(56) References Cited

U.S. PATENT DOCUMENTS

| 6,754,446 | B2 | 6/2004 | Hagimori |
| 6,987,622 | B2 | 1/2006 | Nurishi |
| 7,206,139 | B2 | 4/2007 | Bito |
| 7,463,426 | B2 * | 12/2008 | Nishio ........................ 359/683 |

FOREIGN PATENT DOCUMENTS

| JP | 61-123811 | 6/1986 |
| JP | 2003-202500 | 7/2003 |
| JP | 2004-102089 | 4/2004 |
| JP | 2005-148485 | 6/2005 |
| JP | 2007-25641 | 2/2007 |

* cited by examiner

*Primary Examiner*—David N Spector
(74) *Attorney, Agent, or Firm*—Canon USA Inc IP Div

(57) ABSTRACT

A zoom lens includes, from an object side to an image side, a first lens unit having a positive refractive power, a second lens unit having a negative refractive power and including a reflective member configured to fold an optical path, a third lens unit having a negative refractive power, an aperture stop, and a rear lens unit having a positive refractive power as a whole and including at least one lens unit. During zooming, the second lens unit does not move and the distances between the adjacent lens units change.

13 Claims, 14 Drawing Sheets

ZOOM LENS AND IMAGE PICKUP APPARATUS INCLUDING THE SAME

BACKGROUND OF THE INVENTION

1. Field of the Invention

The present invention relates to a zoom lens for suitable use in an image taking optical system of an image pickup apparatus such as a video camera, a digital still camera, a broadcast camera, or a silver film camera.

2. Description of the Related Art

Recently, image pickup apparatuses (cameras) using solid-state image pickup elements, such as video cameras and digital still cameras, have become smaller with increased functionality. As an image taking optical system used in a camera, a zoom lens that has a high zooming ratio and that can be used in the camera while allowing a compact size of the camera is demanded.

In order both to reduce the size of a camera and to increase the zooming ratio of a zoom lens, a so-called retractable zoom lens is used. In the retractable zoom lens, while image taking is not performed, the distances between lens units are reduced so as to be different from those during an image taking operation.

In another type of zoom lens, a reflective member (prism) for folding an image taking light beam 90° in the optical path is provided in the optical path in order to reduce the thickness of the camera (in the front-rear direction of the camera set for image taking) (U.S. Pat. Nos. 7,206,139 and 6,754,446 and Japanese Patent Laid-Open No. 2004-102089).

According to U.S. Pat. Nos. 7,206,139 and 6,754,446 and Japanese Patent Laid-Open No. 2004-102089, light from an object is folded 90° relative to the optical axis of a lens unit by a prism having a reflective surface, so that the thickness of the camera is reduced so as to be substantially equal to the length between an object-side lens unit and the prism.

A four- or five-unit zoom lens is known as a zoom lens that is used with a high zooming ratio in an image pickup apparatus (Japanese Patent Laid-Open No. 61-123811 and U.S. Pat. No. 6,987,622).

For example, in a known zooming lens, a first lens unit having a positive refractive power, a second lens unit having a negative refractive power, a third lens unit having a negative refractive power, and a rear lens unit including at least one lens unit and having a positive refractive power as a whole are arranged from an object side to an image side.

When a zoom lens in which a reflective member for folding light from the object side is provided in the optical path is applied to a camera, the size of the camera in the thickness direction (camera thickness) can be reduced easily.

However, when the zoom lens including the reflective member provided in the optical path is applied to the camera, it is important to properly set the lens configuration of the zoom lens in order to reduce the camera thickness and to increase the zooming ratio of the zoom lens. In particular, it is important to place the reflective member at a proper position in the optical path.

If the lens configuration of the zoom lens and the position of the reflective member in the optical path are improper, the size (effective diameter) of the reflective member increases, the strokes (moving amounts) of the lens units during zooming for a high zooming ratio increase, and the size of the entire lens system increases. As a result, when the zoom lens is applied to the camera, it is difficult to reduce the camera thickness.

U.S. Pat. No. 7,206,139 discloses a four-unit zoom lens having a zooming ratio of about 6. In this zoom lens, lens units respectively having positive, negative, positive, and positive refractive powers are arranged in that order from the object side to the image side, and a reflective member for folding the optical path is provided in a second lens unit.

Unfortunately, in the zoom lens disclosed in U.S. Pat. No. 7,206,139, when the zooming ratio is further increased, the stroke of a first lens unit relevant to the camera thickness increases, and this makes it difficult to reduce the camera thickness.

In a four-unit zoom lens disclosed in U.S. Pat. No. 6,754,446, lens units respectively having positive, negative, positive, and positive refractive powers are arranged, and a reflective member for folding the optical path is provided in a first lens unit closest to the object side. For this reason, there is a tendency for the reflective member to be large.

In many cases, the size of the image-pickup apparatus in the thickness direction is determined by the size of the reflective member. Therefore, it is not preferable that the reflective member be large.

Japanese Patent Laid-Open No. 2004-102089 discloses a four- or five-unit zoom lens in which lens units having positive, negative, positive, and positive refractive powers or lens units having positive, negative, positive, positive, and positive refractive powers are arranged in that order from the object side to the image side. A reflective member for folding the optical path is provided in a second lens unit.

In the four- or five-unit zoom lens, displacement of the image plane resulting from movement of an image-side lens unit for zooming is corrected by a lens unit closest to the image side, and a zooming ratio of about 10 is achieved by greatly moving a first lens unit to the object side.

Accordingly, the stroke of the first lens unit during zooming is long, and this makes it difficult to reduce the thickness of the camera to which the zoom lens is applied.

In zoom lenses disclosed in Japanese Patent Laid-Open No. 61-123811 and U.S. Pat. No. 6,987,622, lens units having positive, negative, negative, and positive refractive powers or lens units having positive, negative, negative, positive, and positive refractive powers are arranged in that order from the object side to the image side. However, a reflective member for folding the optical path is not used in these zoom lenses.

Therefore, it is difficult to reduce the thickness of the camera when the zoom lens is applied thereto.

SUMMARY OF THE INVENTION

The present invention provides a zoom lens that can be applied to a camera while allowing a small thickness of the camera and that achieves a high zooming ratio and high optical performance over the entire zoom range, and an image pickup apparatus including the zoom lens.

A zoom lens according to an aspect of the present invention includes, from an object side to an image side, a first lens unit having a positive refractive power; a second lens unit having a negative refractive power and including a reflective member configured to fold an optical path; a third lens unit having a negative refractive power; an aperture stop; and a rear lens unit having a positive refractive power as a whole and including at least one lens unit. During zooming, the second lens unit does not move and distances between the adjacent lens units change.

Further features of the present invention will become apparent from the following description of exemplary embodiments with reference to the attached drawings.

DESCRIPTION OF THE EMBODIMENTS

Zoom lenses according to embodiments of the present invention and image pickup apparatuses (shooting apparatuses, imaging apparatuses) including the zoom lenses will be described below.

Zoom lenses according to embodiments of the present invention include a first lens unit having a positive refractive power, a second lens unit having a negative refractive power, a third lens unit having a negative refractive power, an aperture stop, and a rear lens unit having a positive refractive power as a whole and including at least one lens unit. The first lens unit, the second lens unit, the third lens unit, the aperture stop, and the rear lens unit are arranged in that order from an object side to an image side.

During zooming, the second lens unit does not move, and the other lens units move so as to change the distances between the adjacent lens units. In other words, all distances between the adjacent lens units (the distance between the first and second lens units, the distance between the second and third lens units, and the distance between the third and rear lens units) change during zooming.

The second lens unit includes a reflective member that folds a light beam from an object, for example, a light beam on the optical axis, 90° or about 90° (90°±10°).

Figure 1:
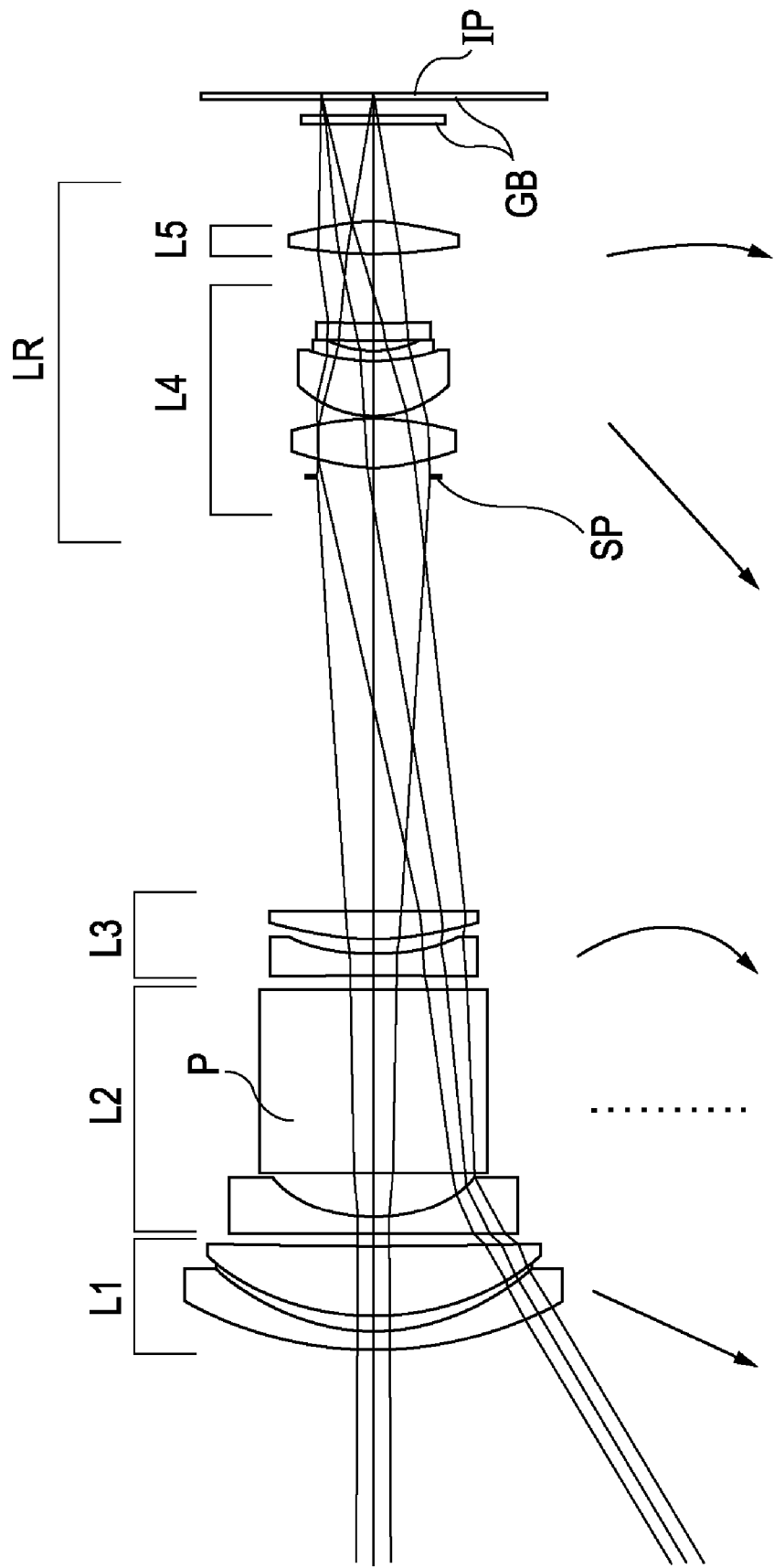
FIG. 1 is a cross-sectional view of a zoom lens at a wide angle end according to a first embodiment of the present invention.
Figure 2:
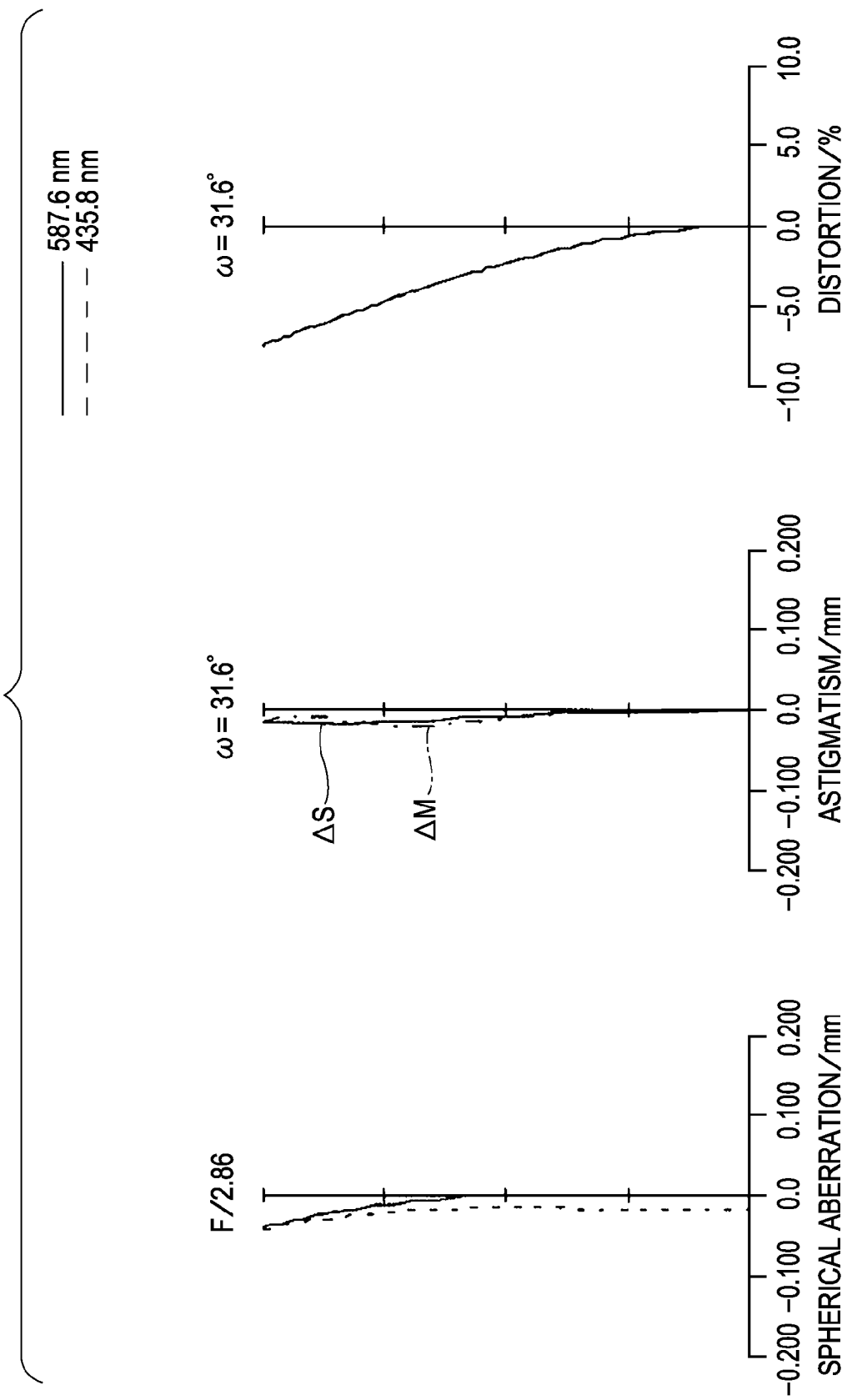
FIG. 2 includes aberration diagrams at the wide angle end in the first embodiment.
Figure 3:
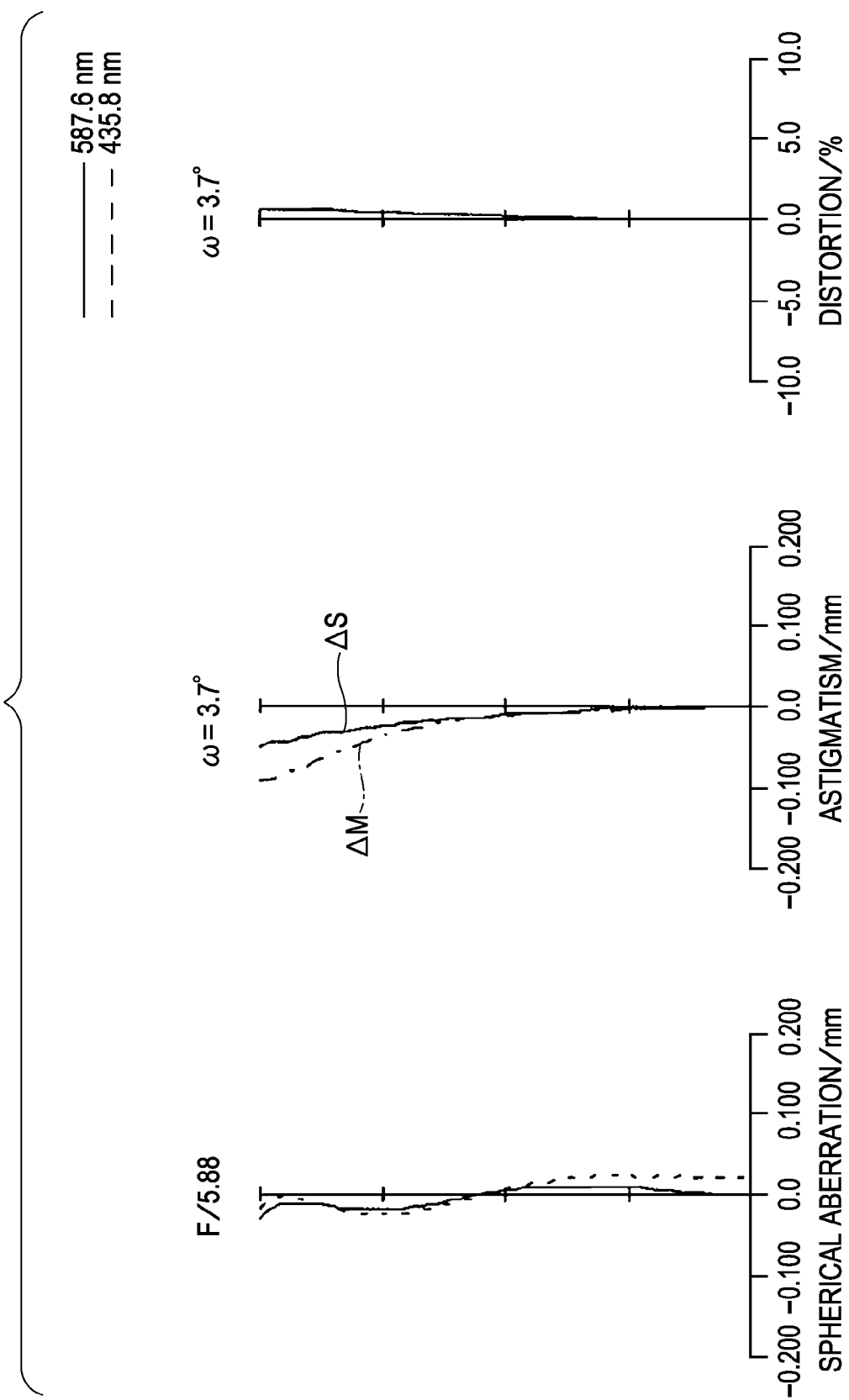
FIG. 3 includes aberration diagrams at a telephoto end in the first embodiment.

FIG. 1 is a cross-sectional view of a zoom lens at a wide angle end (short focal length end) according to a first embodiment of the present invention when the optical path of the zoom lens is opened up. FIGS. 2 and 3 include aberration diagrams of the zoom lens at the wide angle end and a telephoto end (long focal length end) in the first embodiment.

Figure 4:
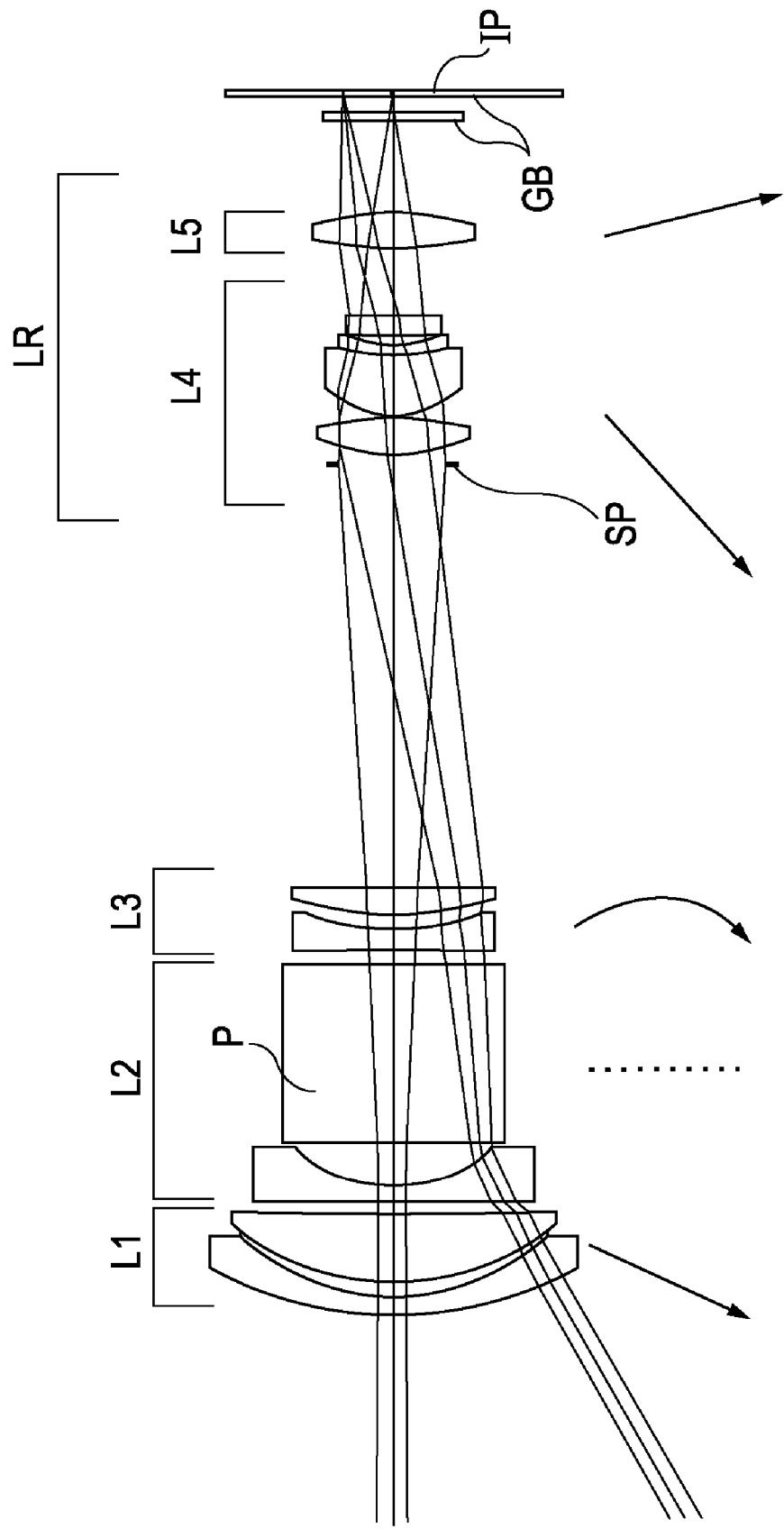
FIG. 4 is a cross-sectional view of a zoom lens at a wide angle end according to a second embodiment of the present invention.
Figure 5:
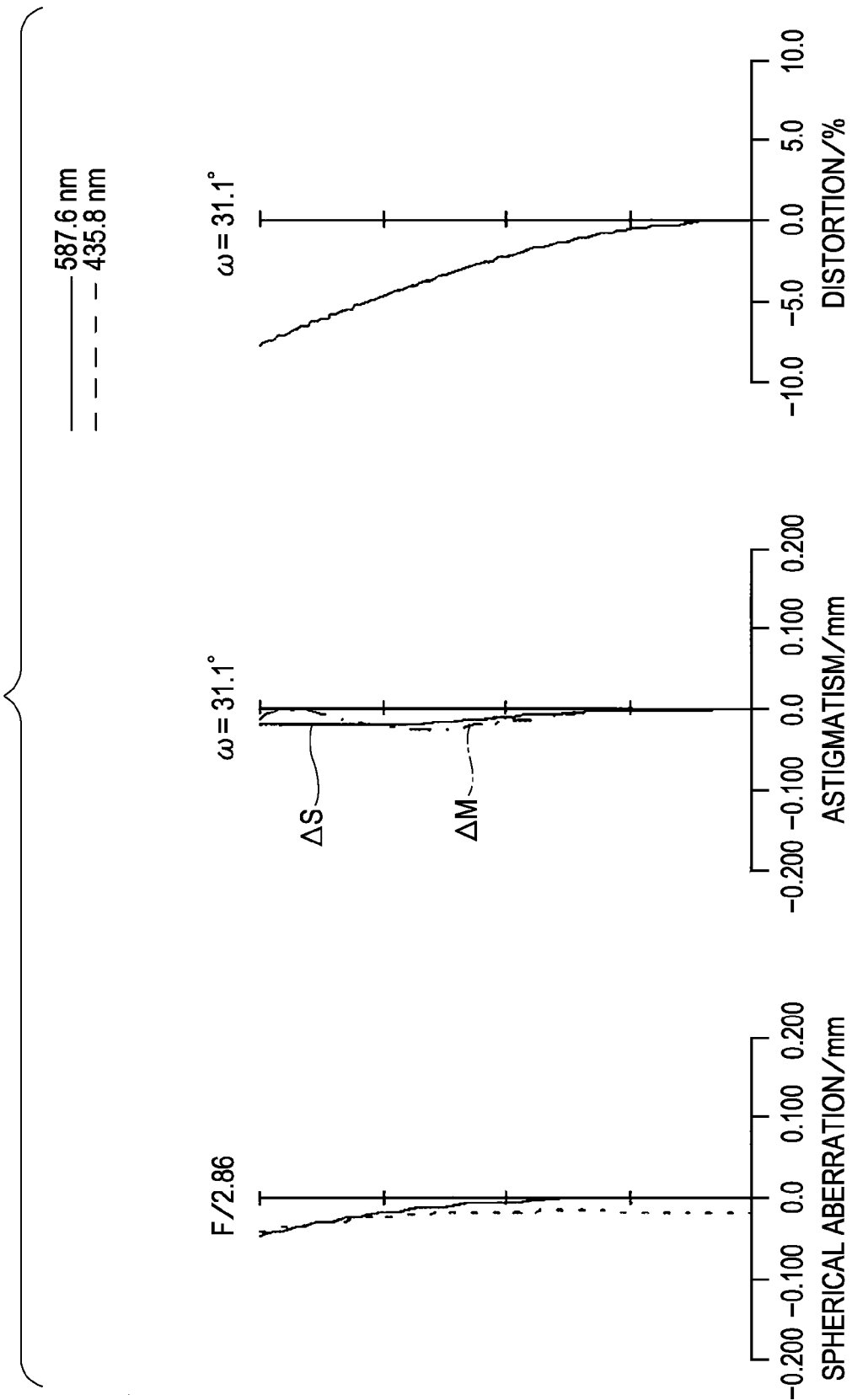
FIG. 5 includes aberration diagrams at the wide angle end in the second embodiment.
Figure 6:
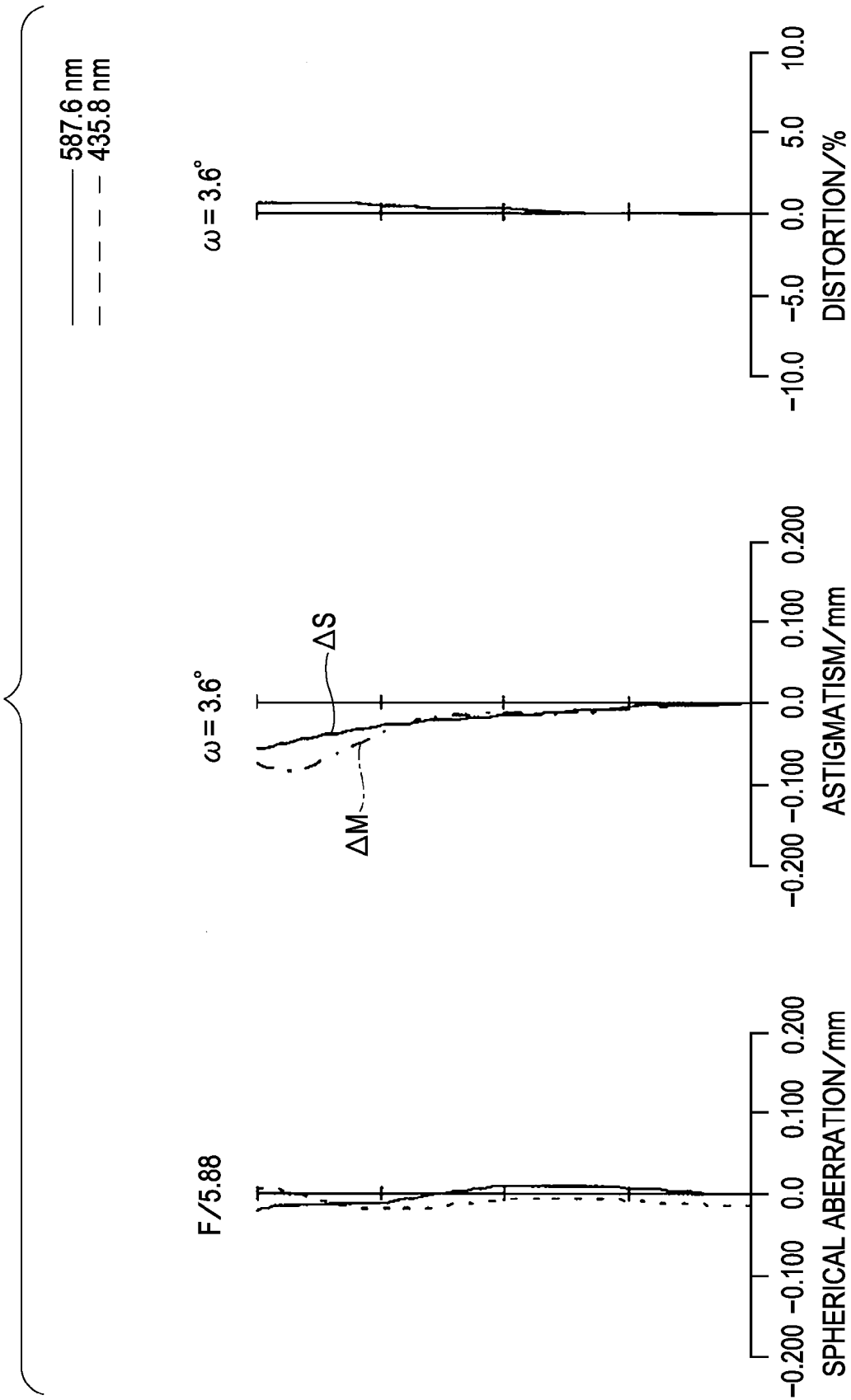
FIG. 6 includes aberration diagrams at a telephoto end in the second embodiment.

FIG. 4 is a cross-sectional view of a zoom lens at a wide angle end according to a second embodiment of the present invention when the optical path of the zoom lens is opened up. FIGS. 5 and 6 include aberration diagrams of the zoom lens at the wide angle end and a telephoto end in the second embodiment.

Figure 7:
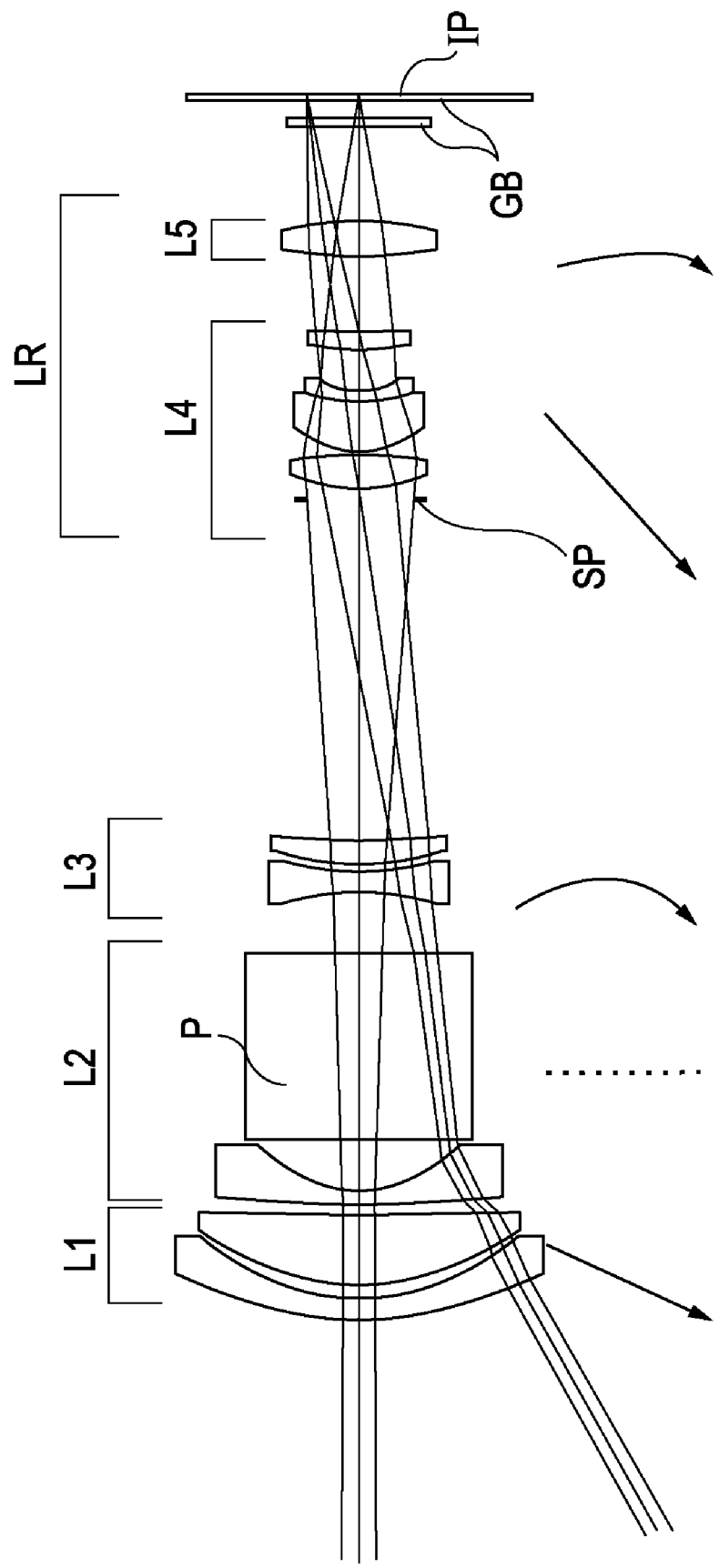
FIG. 7 is a cross-sectional view of a zoom lens at a wide angle end according to a third embodiment of the present invention.
Figure 8:
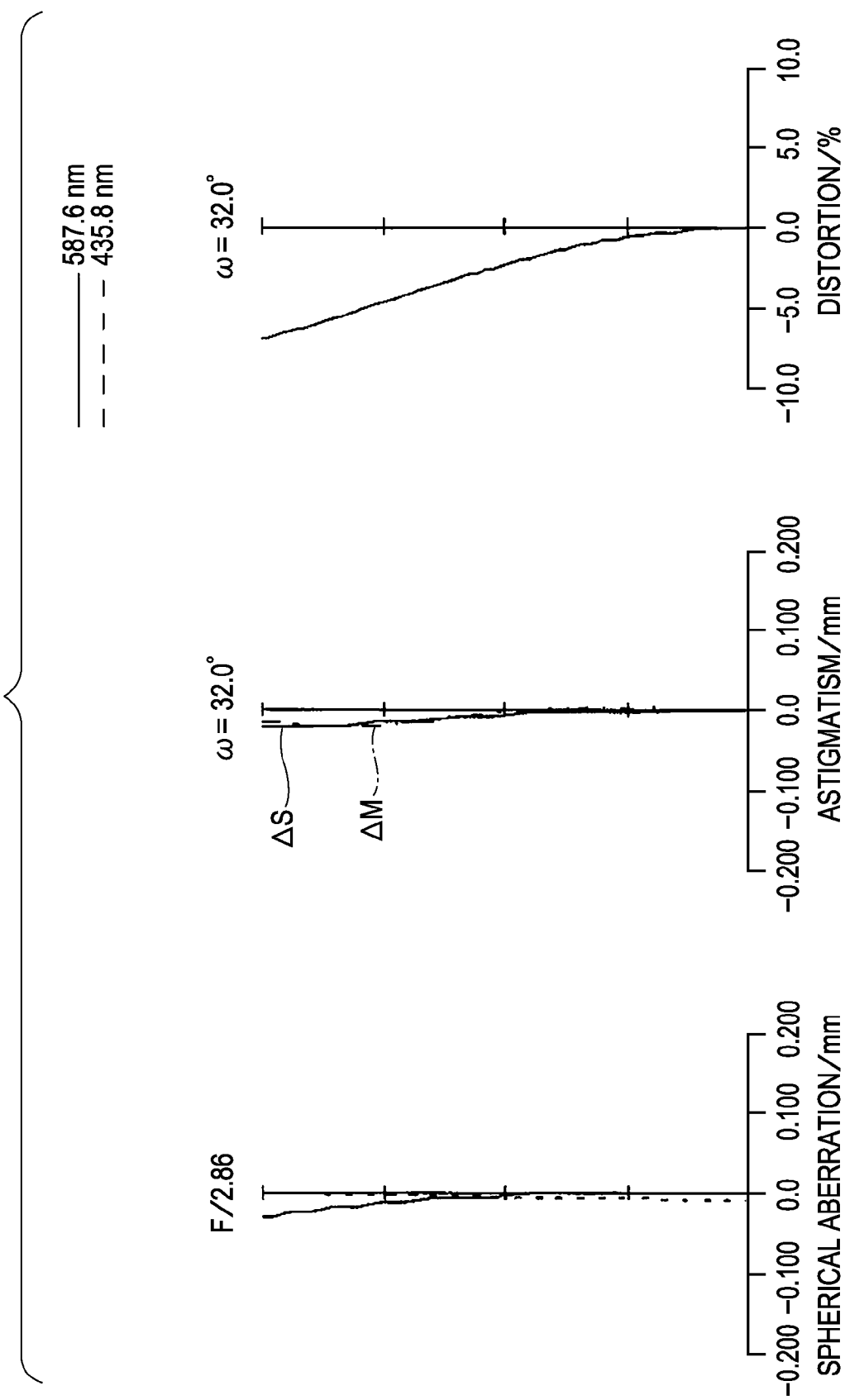
FIG. 8 includes aberration diagrams at the wide angle end in the third embodiment.
Figure 9:
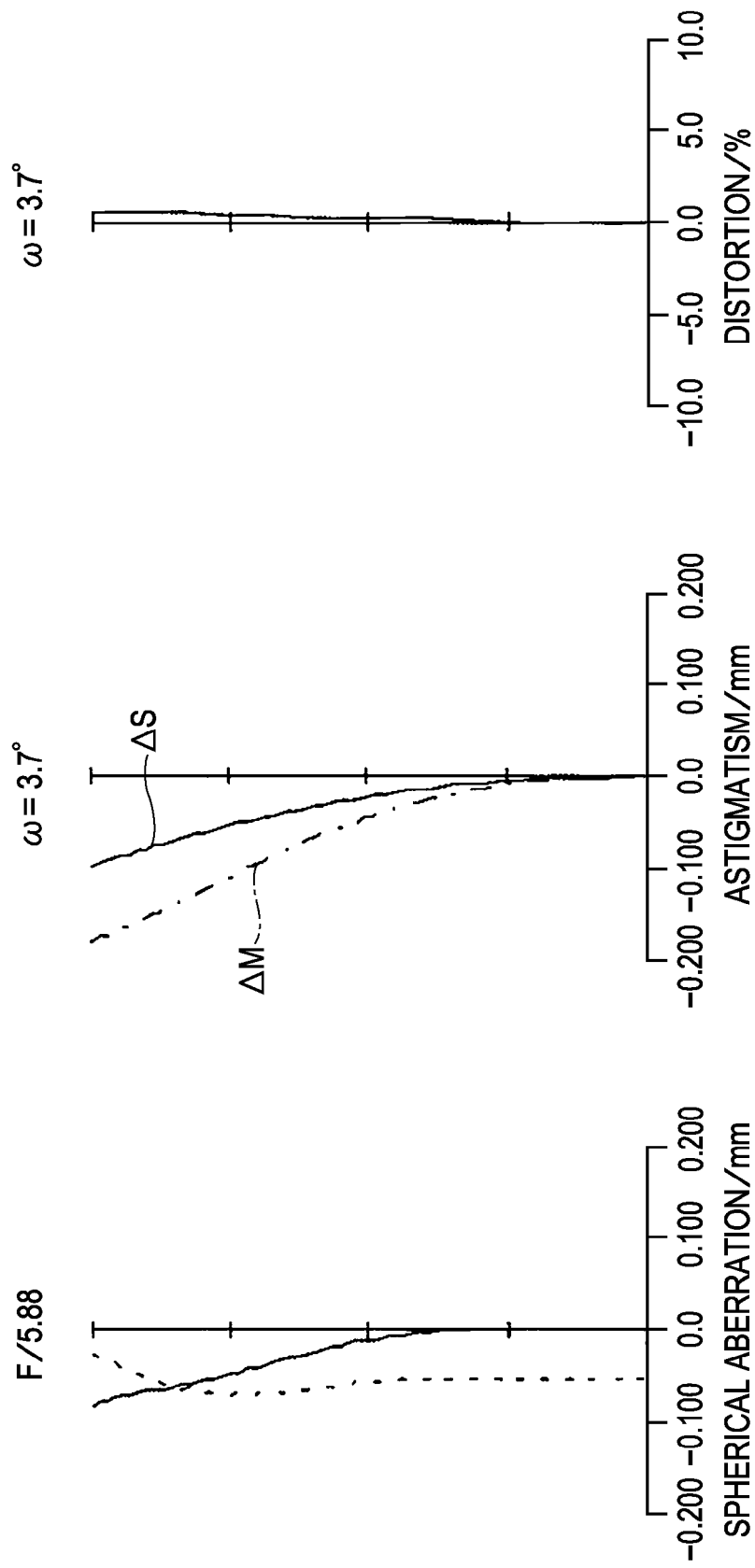
FIG. 9 includes aberration diagrams at a telephoto end in the third embodiment.

FIG. 7 is a cross-sectional view of a zoom lens at a wide angle end according to a third embodiment of the present invention when the optical path of the zoom lens is opened up. FIGS. 8 and 9 include aberration diagrams of the zoom lens at the wide angle end and a telephoto end in the third embodiment.

Figure 10:
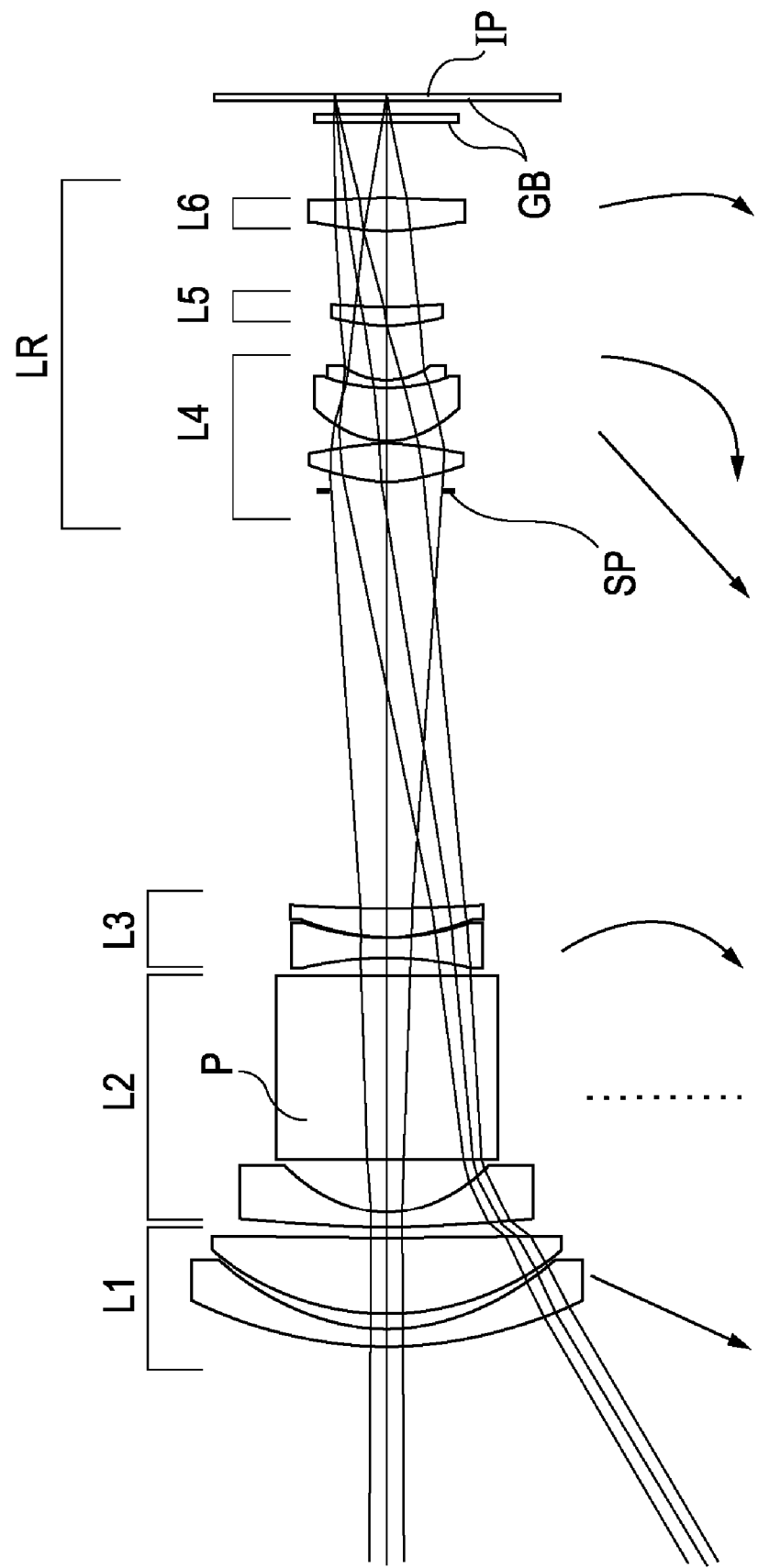
FIG. 10 is a cross-sectional view of a zoom lens at a wide angle end according to a fourth embodiment of the present invention.
Figure 11:
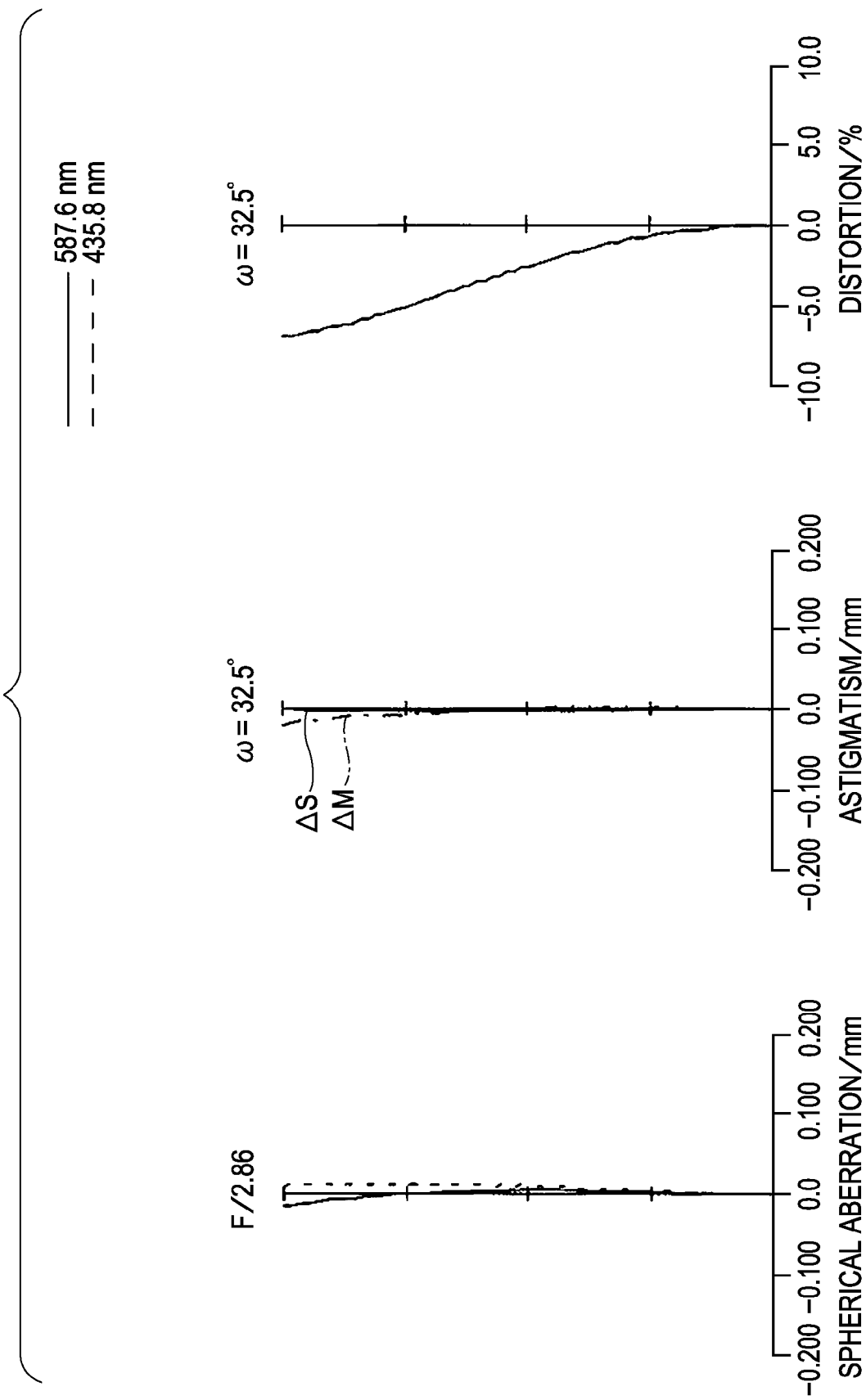
FIG. 11 includes aberration diagrams at the wide angle end in the fourth embodiment.
Figure 12:
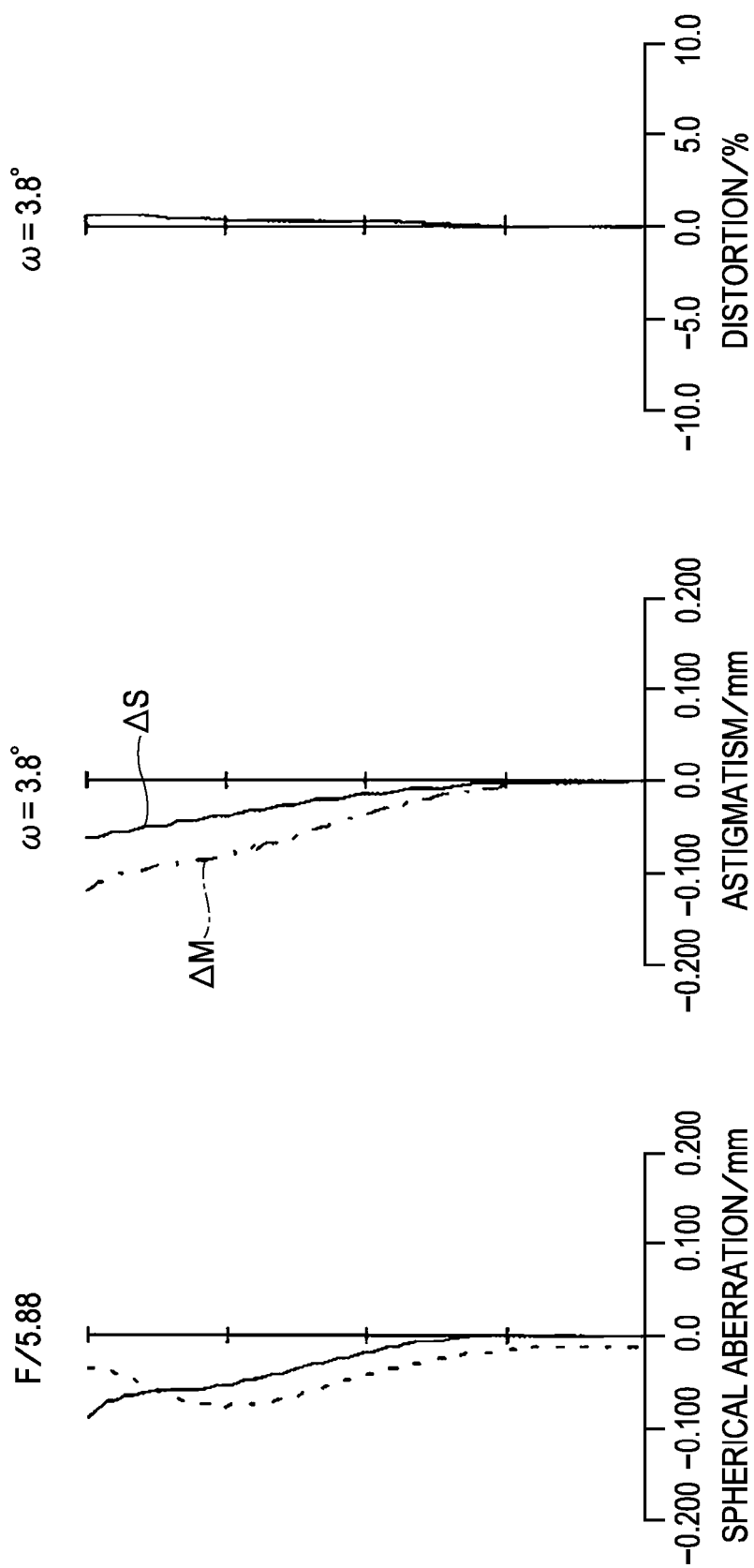
FIG. 12 includes aberration diagrams at a telephoto end in the fourth embodiment.

FIG. 10 is a cross-sectional view of a zoom lens at a wide angle end according to a fourth embodiment of the present invention when the optical path of the zoom lens is opened up. FIGS. 11 and 12 include aberration diagrams of the zoom lens at the wide angle end and a telephoto end in the fourth embodiment.

Figure 13:
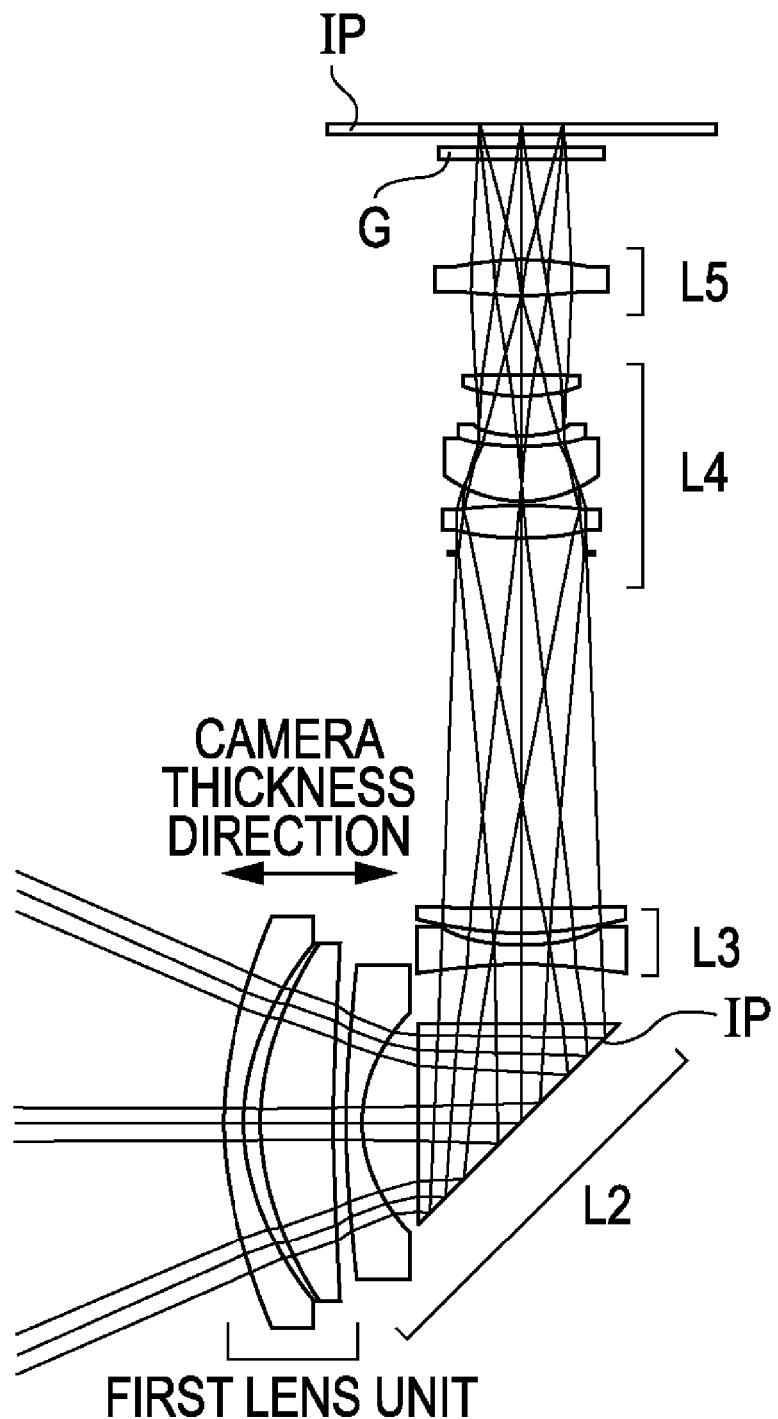
FIG. 13 is a schematic structural view of a folding optical system to which an embodiment of the present invention is applied.

FIG. 13 is a cross-sectional view of the zoom lens of the third embodiment when attached to a camera in a state in which the optical path is folded.

Figure 14:
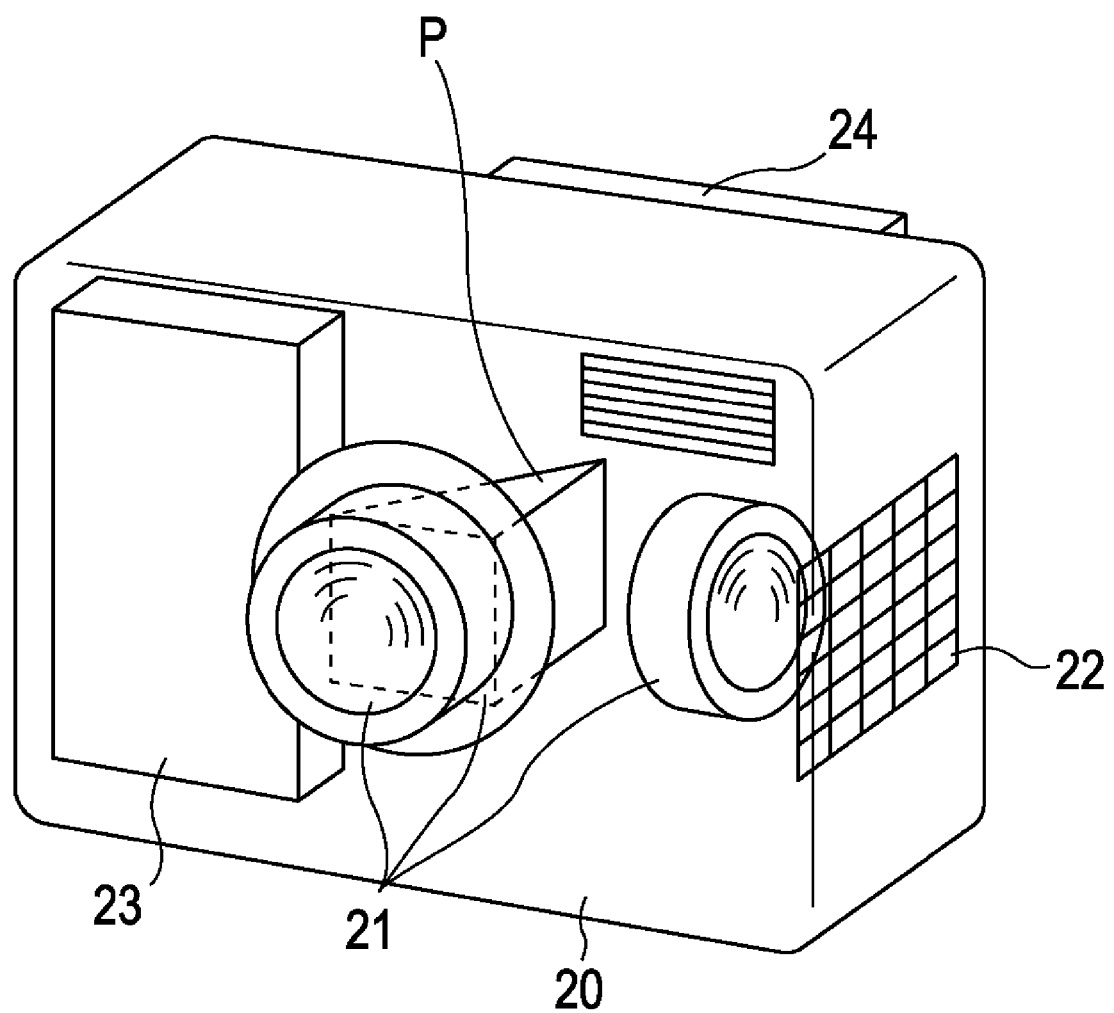
FIG. 14 is a schematic view showing the principal part of an image pickup apparatus according to an embodiment of the present invention.

FIG. 14 is a schematic view showing the principal part of a digital camera (image pickup apparatus) including the zoom lens according to the present invention.

The zoom lenses according to the embodiments serve as image taking lens systems used in image pickup apparatuses. In the cross-sectional views of the zoom lenses, the left side is an object side (front side) and the right side is an image side (rear side).

When the zoom lenses of the embodiments are used, for example, as projection lenses of projectors, a screen is provided on the let side and an image to be projected is provided on the right side in the cross-sectional views of the zoom lenses when the optical path is opened up.

When i represents the order number of the lens unit from the object side, Li denotes the i-th lens unit. LR denotes a rear lens unit including at least one lens unit and having a positive refractive power (optical power=reciprocal of focal length) as a whole.

In FIGS. 1, 4, 7, and 13 serving as the lens cross-sectional views, a first lens unit L1 has a positive refractive power.

A second lens unit L2 has a negative refractive power, a third lens unit L3 has a negative refractive power, a fourth lens unit L4 has a positive refractive power, and a fifth lens unit L5 has a positive refractive power. The fourth and fifth lens units L4 and L5 constitute a rear lens unit LR.

In FIG. 10 serving as the lens cross-sectional view, a first lens unit L1 has a positive refractive power, a second lens unit L2 has a negative refractive power, a third lens unit L3 has a negative refractive power, a fourth lens unit L4 has a positive refractive power, a fifth lens unit L5 has a positive refractive power, and a sixth lens unit L6 has a positive refractive power.

The fourth, fifth, and sixth lens units L4, L5, and L6 constitute a rear lens unit LR.

The second lens unit L2 includes at least one negative lens and a reflective member (prism P) having a reflecting surface.

More specifically, in the second lens unit L2, a negative lens having a concave surface on the image side and a reflective member P are arranged in that order from the object side to the image side.

SP denotes an aperture stop. The reflective member P is formed by a prism for folding the optical path 90°. An optical block GB corresponds to an optical filter, a face filter, or the like. An image plane IP corresponds to an image pickup surface of a solid-state image pickup element (photoelectric conversion element), such as a CCD sensor or a CMOS sensor, when the image taking optical system (shooting optical system, photographing optical system) is used in a video camera or a digital camera, and to a film surface when the image taking optical system is used in a silver film camera.

Arrows show moving loci of the lens units during zooming from the wide angle end to the telephoto end.

In the zoom lenses of the embodiments, a desired zooming ratio (for example, a zooming ratio of 6 or more) is ensured by moving all lens units except the second lens unit L2 during zooming.

The terms "wide angle end" and "telephoto end" refer to zoom positions where the zoom lens unit for zooming (first and fourth lens units L1 and L4) is placed at either end of a mechanically movable range on the optical axis.

In the zoom lenses of the embodiments, during zooming, the second lens unit L2 does not move, and the lens units other than the second lens unit L2 move while changing the distances between the lens units.

In the positive lead type zoom lenses of the embodiments, the effective diameter is relatively small in the second lens unit L2. For this reason, the reflective member P for folding the optical path from the object side is provided in the second lens unit L2.

Thus, the size of the reflective member P is made smaller than when the reflective member P is provided in the first lens unit L1 closest to the object side. Moreover, when the zoom lens is applied to a camera, the thickness of the camera is reduced. Further, since it is better that the incident angle of an off-axis principal ray on the image plane IP be smaller in an application to a digital still camera or the like, the third lens unit L3 having a negative refractive power is provided on the object side of the aperture stop SP.

In order to correct displacement of the image plane resulting from monotonous movement of the fourth lens unit L4 to the object side during zooming from the wide angle end to the telephoto end, the third lens unit L3 is moved as well as the lens unit closest to the image side. This can properly correct displacement of the image plane when the zooming ratio is increased.

For this reason, a high zooming ratio can be achieved in the fourth lens unit L4, and a zoom lens with a high zooming ratio can be realized without greatly moving the first lens unit L12 to the object side.

As described above, in the embodiments, the lens units respectively having positive, negative, and negative refractive powers, the aperture stop SP, and the rear lens unit LR having a positive refractive power are arranged in that order from the object side to the image side. By placing the prism P for folding the optical path in the second lens unit L2 that does not move for zooming, the size of the prism relevant to the camera thickness is reduced when the zoom lens is applied to the camera, as shown in FIG. 13.

Displacement of the image plane resulting from movement of the zooming lens unit is properly corrected by the third lens unit L3. Moreover, the stroke of the first lens unit L1 for zooming is reduced by providing the rear lens unit LR with a large share of zooming ratio.

In particular, the prism P for folding the optical path is provided in the second lens unit L2 that does not move during zooming, and the third lens unit L3 set as the lens unit for correcting the position of the image plane is moved during zooming. This can reduce the stroke of the first lens unit L1 while ensuring a high zooming ratio.

Consequently, when the zoom lens is applied to a camera, the thickness of the camera is reduced even though the zooming ratio is high, as shown in FIG. 14.

In the embodiments, at least one of the following conditions is satisfied. This provides advantages corresponding to the conditions.

$$0.75 < Zr/Zf < 3.00 \tag{1}$$

$$0.05 < \sqrt{(fw \cdot ft)}/f3 < 0.70 \tag{2}$$

$$0.3 < (1-\beta 3t^2) \cdot \beta rt^2 < 2.0 \tag{3}$$

$$0.007 \le f2/f3 < 0.900 \tag{4}$$

$$1.61 < N1p < 1.90 \tag{5}$$

$$0.5 < (r1+r2)/(r1-r2) < 1.5 \tag{6}$$

$$0 < Ls/fw < 7 \tag{7}$$

$$0 < L1/fw < 2 \tag{8}$$

where Zr represents the zooming ratio of the rear lens unit LR, Zf represents the sum of zooming ratios of the second and third lens units L2 and L3, f2 and f3 respectively represent the focal lengths of the second and third lens units L2 and L3, fw and ft respectively represent the focal lengths of the entire system at the wide angle end and the telephoto end, $\beta 3t$ and $\beta rt$ respectively represent the lateral magnifications of the third lens unit L3 and the rear lens unit LR at the telephoto end, the first lens unit L1 includes at least one positive lens, N1p represents the highest refractive index of the refractive indices of the materials of the positive lens, the second lens unit L2 includes a negative lens, r1 and r2 respectively represent the radii of curvature of an object-side surface and an image-side surface of the negative lens, Ls represents the distance from the vertex of the surface of the third lens unit L3 closest to the image side to the aperture stop SP at the wide angle end, and L1 represents the block thickness of the first lens unit L1 (length from the surface closest to the object side to the surface closest to the image side).

The technical meaning of the above-described conditional expressions will now be described.

Conditional Expression (1) specifies the share of the zooming ratio of the rear lens unit LR including the fourth lens unit L4 and so on and the sum of zooming ratios of the second and third lens units L2 and L3. When the value is less than the lower limit in Conditional Expression 1, the stroke (moving amount) of the first lens unit L1 during zooming increases, and this increases the thickness of the camera to which the zoom lens is applied.

Conversely, when the value is more than the upper limit, the share of zooming ratio of the rear lens unit LR is too large, and aberrations, such as spherical aberration, significantly change during zooming.

It is more preferable to set the value within a range defined by the following Conditional Expression 1a. In this case, aberration changes during zooming are reduced, and a zoom lens in which the stroke of the first lens unit L1 is short is realized easily.

$$1.1 < Zr/Zf < 2.0 \tag{1a}$$

Conditional Expression 2 specifies the focal length range of the third lens unit L3. When the value is less than the lower limit in Conditional Expression 2, the refractive power of the third lens unit L3 decreases, and it is difficult to correct displacement of the image plane resulting from movement of the fourth lens unit L4 for zooming. Conversely, when the value is more than the upper limit, the size of the reflective member P for folding the optical path increases undesirably.

It is more preferable to set the value within a range defined by the following Conditional Expression 2a. In this case, displacement of the image plane during zooming can be properly corrected, and the reflective member P for folding the optical path in the zoom lens can be compact.

$$0.09 < \sqrt{(fw \cdot ft)}/f3 < 0.40 \quad (2a)$$

When the value is less than the lower limit in Conditional Expression 3, the moving amount of the third lens unit L3 during zooming increases, or the stroke of the first lens unit L1 increases. Conversely, when the value is more than the upper limit, the size of the reflective member P for folding the optical path increases undesirably.

It is more preferable to set the value within a range defined by the following Conditional Expression 3a. In this case, displacement of the image plane during zooming can be properly corrected, and the reflective member P can be easily made compact in the zoom lens.

$$0.35 < (1 - \beta 3t^2) \cdot \beta rt^2 < 1.75 \quad (3a)$$

Conditional Expression 4 specifies the ratio of the focal length of the second lens unit L2 and the focal length of the third lens unit L3. When the value is less than the lower limit in Conditional Expression 4, the refractive power of the third lens unit L3 decreases, and it is difficult to correct displacement of the image plane resulting from movement of the fourth lens unit L4 during zooming. Conversely, when the value is more than the upper limit, the size of the reflective member P for folding the optical path increases undesirably.

It is more preferable to set the value within a range defined by the following Conditional Expression 4a. In this case, displacement of the image plane during zooming can be properly corrected, and the reflective member P can be easily made compact in the zoom lens.

$$0.05 < f2/f3 < 0.30 \quad (4a)$$

Conditional Expression 5 specifies the highest refractive index of the refractive indices of the materials of the positive lens that forms the first lens unit L1. When the value is less than the lower limit in Conditional Expression 5, correction of aberrations is difficult, and the thickness of the first lens unit L1 increases. Further, when a material having a value more than the upper limit is used, correction of chromatic aberration is difficult.

It is more preferable to set the value within a range defined by the following Conditional Expression 5a. In this case, the thickness of the first lens unit L1 in the zoom lens can be reduced easily.

$$1.695 < N1p < 1.9000 \quad (5a)$$

Conditional Expression 6 specifies the shape of the negative lens in the second lens unit L2. When the value is less than the lower limit in Conditional Expression 6, distortion increases undesirably. Conversely, when the value is more than the upper limit, the negative lens has a meniscus shape in which the radius of curvature r2 of the image-side surface is small, and a wide space to place the negative lens is necessary.

It is more preferable to set the value within a range defined by the following Conditional Expression 6a. In this case, the negative lens can be placed in the zoom lens while the entire system of the zoom lens is compact.

$$0.8 < (r1 + r2)/(r1 - r2) < 1.4 \quad (6a)$$

Conditional Expression 7 specifies the ratio of the distance between the third lens unit L3 and the aperture stop SP and the focal length of the entire system at the wide angle end. When the value is more than the upper limit in Conditional Expression 7, the size of the reflective member P for folding the optical path increases.

When the value is less than the lower limit, it is difficult to position the aperture stop SP. It is more preferable to set the value within a range defined by the following Conditional Expression 7a. In this case, the reflective member P for folding the optical path can be can be easily made small in the zoom lens.

$$0 < Ls/fw < 5 \quad (7a)$$

Conditional Expression 8 specifies the ratio of the block thickness of the first lens unit L1 (length from the object-side surface to the image-side surface of the first lens unit L1) and the focal length of the entire system at the wide angle end. When the value is less than the lower limit in Conditional Expression 8, the positive refractive power of the first lens unit L1 is insufficient, and the stroke of the first lens unit L1 during zooming increases in order to obtain a desired zooming ratio. Conversely, when the value is more than the upper limit, it is difficult to design the camera to be thin when the zoom lens is applied thereto. It is more preferable to set the value within a range defined by the following Conditional Expression 8a. In this case, the thickness of the camera to which the zoom lens is applied can be reduced further.

$$0.9 < L1/fw < 1.4 \quad (8a)$$

As described above, according to the embodiments, it is possible to realize a zoom lens that has a high zooming ratio of 6 or more and that is suitably used in a compact digital camera while allowing a small thickness of the camera.

A description will now be given of lens configurations of the zoom lenses of the embodiments.

The zoom lens according to the first embodiment includes a first lens unit L1 having a positive refractive power, a second lens unit L2 having a negative refractive power, a third lens unit L3 having a negative refractive power, a fourth lens unit L4 having a positive refractive power, and a fifth lens L5 unit having a positive refractive power. The first to fifth lens units L1 to L5 are arranged in that order from the object side to the image side.

The second lens unit L2 includes a reflective member P for folding the optical path from the object. Compared with the type in which the reflective member P is placed in the first lens unit closest to the object side, the size of the reflective member P is reduced, and the thickness of the camera to which the zoom lens is applied is reduced.

During zooming from the wide angle end to the telephoto end, the first lens unit L1 moves to the object side. In this case, the first lens unit L1 may move to the object while forming a locus that is convex on the image side.

Zooming is performed by monotonously moving the fourth lens unit L4 to the object side. In order to correct displacement of the image plane due to zooming, the third lens unit L3 and the fifth lens unit L5 move nonlinearly.

In the first embodiment, both the third lens unit L3 and the fifth lens unit L5 move while forming a locus that is convex on the image side during zooming. Accordingly, a high zooming ratio can be obtained in the fourth lens unit L4 during zooming, and a zoom lens having a high zooming ratio of 10 is realized without greatly moving the first lens unit L1 to the object side. When the image taking distance is changed, focusing is performed by the fifth lens unit L5.

Focusing from an object at infinity to a near object is performed by moving the fifth lens unit L5 forward.

The first lens unit L1 that is relevant to the camera thickness is constituted by two lenses, namely, a meniscus negative lens having a convex surface on the object side and a positive lens having a convex surface on the object side. In order to minimize the thickness of the positive lens, the positive lens is formed of a high-refractive-index material having a refractive index Nd of 1.79 (trade name: S-LAH64 from Ohara Inc.).

In order to reduce the stroke of the first lens unit L1 during zooming, the share of zooming ratio of the fourth lens unit L4 and the fifth lens unit L5 on the image side (Conditional Expression 1) is set at a large value of 1.67. This increases the zooming ratio of the zoom lens while allowing a small thickness of the camera to which the zoom lens is applied.

The third lens unit L3 includes a negative lens and a positive lens. The fourth lens unit L4 includes a positive lens, a positive lens, a negative lens, and a positive lens. The fifth lens unit L5 is formed by a single positive lens.

The zoom lens according to the second embodiment includes a first lens unit L1 having a positive refractive power, a second lens unit L2 having a negative refractive power, a third lens unit L3 having a negative refractive power, a fourth lens unit L4 having a positive refractive power, and a fifth lens unit L5 having a positive refractive power. The first to fifth lens units L1 to L5 are arranged in that order from the object side to the image side.

The second lens unit L2 includes a reflective member P for folding the optical path from the object side. During zooming from the wide angle end to the telephoto end, the first lens unit L1 and the fourth lens unit L4 monotonously move to the object side.

In order to correct displacement of the image plane due to zooming, the third lens unit L3 and the fifth lens unit L5 are moved, similarly to the first embodiment. This provides advantages similar to those of the first embodiment.

The first lens unit L1 that is relevant to the camera thickness is constituted by a negative lens and a positive lens. In order to minimize the thickness of the positive lens, the positive lens is formed of a high-refractive-index material having a refractive index Nd of 1.83 (trade name: S-LAH55 from Ohara Inc.).

In the second embodiment, similarly to the first embodiment, the share of zooming ratio of the fourth lens unit L4 and the fifth lens unit L5 on the image side (Conditional Expression 1) is set at a large value of 1.63 in order to reduce the stroke of the first lens unit L1 for zooming. This increases the zooming ratio of the zoom lens while allowing a small thickness of the camera to which the zoom lens is applied. When the image taking distance is changed, focusing is performed by the fifth lens unit L5, similarly to the first embodiment.

Structures of the third, fourth, and fifth lens units are similar to those adopted in the first embodiment.

The zoom lens according to the third embodiment includes a first lens unit L1 having a positive refractive power, a second lens unit L2 having a negative refractive power, a third lens unit L3 having a negative refractive power, a fourth lens unit L4 having a positive refractive power, and a fifth lens unit L5 having a positive refractive power. The first to fifth lens units L1 to L5 are arranged in that order from the object side to the image side.

The second lens unit L2 includes a reflective member P for folding the optical path from the object side. During zooming from the wide angle end to the telephoto end, the first lens unit L1 and the fourth lens unit L4 move to the object side.

In order to correct displacement of the image plane due to zooming, the third lens unit L3 and the fifth lens unit L5 are moved. This provides advantages similar to those of the first embodiment.

In the third embodiment, the share of zooming ratio of the fourth lens unit L4 and the fifth lens unit L5 on the image side (Conditional Expression 1) is also set at a large value of 1.27 in order to reduce the stroke of the first lens unit L1 for zooming. This increases the zooming ratio of the zoom lens while allowing a small thickness of the camera to which the zoom lens is applied. When the image taking distance is changed, focusing is performed by the fifth lens unit L5, similarly to the first embodiment.

Structures of the third, fourth, and fifth lens units are similar to those adopted in the first embodiment.

The zoom lens according to the fourth embodiment includes a first lens unit L1 having a positive refractive power, a second lens unit L2 having a negative refractive power, a third lens unit L3 having a negative refractive power, a fourth lens unit L4 having a positive refractive power, a fifth lens unit L5 having a positive refractive power, and a sixth lens unit L6 having a positive refractive power. The first to sixth lens units L1 to L6 are arranged in that order from the object side to the image side.

The second lens unit L2 includes a reflective member P for folding the optical path from the object side. During zooming from the wide angle end to the telephoto end, the first lens unit L1 and the fourth lens unit L4 move to the object side.

In order to correct displacement of the image plane due to zooming, the third, fifth, and sixth lens units L3, L5, and L6 are moved. This provides advantages similar to those of the first embodiment.

In the fourth embodiment, the share of zooming ratio of the fourth lens unit L4 to the sixth lens unit L6 on the image side (Conditional Expression 1) is also set at a large value of 1.81 in order to reduce the stroke of the first lens unit L1 for zooming. This increases the zooming ratio of the zoom lens while allowing a small thickness of the camera to which the zoom lens is applied. When the image taking distance is changed, focusing is performed by the sixth lens unit L6.

Focusing from an object at infinity to a near object is performed by moving the sixth lens unit L6 forward. The third lens unit L3 includes a negative lens and a positive lens. The fourth lens unit L4 includes a positive lens, a positive lens, and a negative lens. Each of the fifth and sixth lens units L5 and L6 is formed by a single positive lens.

In the zoom lens according to any of the embodiments, the aperture diameter of the aperture stop SP may be controlled so as to reduce the change in f-number during zooming. In a case in which the zoom lens is combined with an image pickup apparatus including an image pickup element that converts an optical image formed on a light-receiving surface into electric signals, when the amount of distortion of the zoom lens is large, the distortion may be corrected electrically.

A description will now be given of an example of a digital camera (optical apparatus) using the zoom lens according to the embodiment of the present invention as an image taking optical system, with reference to FIG. 14.

Referring to FIG. 14, the digital camera includes a digital camera body 20, an image taking optical system 21 formed by the zoom lens according to any of the above-described embodiments, and a prism P. The prism P guides a subject image (image taking light) passing through the image taking optical system 21 onto an image pickup element (photoelectric conversion element) 22 such as a CCD. The digital camera also includes a recording unit 23 that records the subject image received by the image pickup element 22, and a finder 24 through which the subjected image displayed on a display element (not shown) is viewed. The display element is formed by, for example, a liquid crystal panel, and displays the subject image formed on the image pickup element 22.

By thus applying the zoom lens according to the embodiment of the present invention to an optical apparatus such as a digital camera, a compact image pickup apparatus having high optical performance is realized.

Numerical examples corresponding to the above-described embodiments of the present invention will now be described.

In the numerical examples, i represents the order number of the lens surface from the object side, Ri represents the radius of curvature of the lens surface, Di represents the lens thickness and air gap between the i-th lens surface and the i+1-th lens surface, and Ni and vi respectively represent the refractive index and the Abbe number for the d-line.

Four surfaces closest to the image side are formed by flat surfaces corresponding to a glass block and a color combining prism. Further, k, A, B, C, D, and E are aspherical coefficients.

The aspherical shape is given by the following expression:

$$x = (h^2/R)/[1+\{1-(1+k)(h/R)^2\}^{1/2}] + Ah^4 + Bh^6 + Ch^8 + Dh^{10} + Eh^{12}$$

where x represents the displacement in the optical axis direction at a height h from the optical axis with reference to the vertex of the surface, and R represents the radius of curvature. The relationships between the above-described conditional expressions and the numerical examples are shown in Table 1.

First Numerical Example f: 5.9 mm~56.6 mm FNO: 2.86~5.88 ω: 31.68°~3.68°

|    | R | D | N | v |
|----|---|---|---|---|
| 1  | 24.736 | 1.20 | 1.847 | 23.8 |
| 2  | 14.468 | 0.85 | 1.633 | 23.0 |
| 3  | 16.261 | 4.41 | 1.788 | 47.4 |
| 4  | 195.028 | (variable) | | |
| 5  | 1941.150 | 0.95 | 1.883 | 40.8 |
| 6  | 9.090 | 3.00 | | |
| 7  | inf. | 11.50 | 2.003 | 28.3 |
| 8  | inf. | (variable) | | |
| 9  | (aspherical) | 1.35 | 1.689 | 31.1 |
| 10 | (aspherical) | 0.87 | | |
| 11 | 20.788 | 1.84 | 1.923 | 18.9 |
| 12 | −223.767 | (variable) | | |
| 13 | (aspherical) | 2.99 | 1.487 | 70.2 |
| 14 | (aspherical) | 0.10 | | |
| 15 | 6.465 | 3.59 | | |
| 16 | 13.457 | 0.60 | 2.003 | 28.3 |
| 17 | 5.336 | 0.61 | | |
| 18 | 16.116 | 1.12 | 1.487 | 70.2 |
| 19 | 31.696 | (variable) | | |
| 20 | (aspherical) | 2.01 | 1.487 | 70.2 |
| 21 | −19.355 | (variable) | | |
| 22 | inf. | 0.60 | 1.516 | 64.1 |
| 23 | inf. | 0.90 | | |
| 24 | inf. | 0.40 | 1.516 | 64.1 |
| 25 | inf. | | | |

Distance Data

|     | W | T |
|-----|-----|-------|
| d4  | 0.89 | 14.94 |
| d8  | 0.94 | 0.94 |
| d12 | 27.92 | 2.41 |
| d19 | 4.49 | 34.73 |
| d21 | 6.31 | 1.48 |

Aspherical Surface Data

| | | | | |
|---|---|---|---|---|
| 9 | 1/R = −1.966e−002 | k = −5.528e+001 | A = 1.008e−004 | B = 2.274e−006 |
| | C = −5.971e−008 | D = 1.100e−009 | E = 0.000e+000 | |
| 10 | 1/R = 6.269e−002 | k = 7.197e−001 | A = 3.530e−005 | B = 7.190e−007 |
| | C = −4.383e−008 | D = 1.009e−009 | E = 0.000e+000 | |
| 13 | 1/R = 8.458e−002 | k = 1.490e+000 | A = −2.546e−004 | B = −1.667e−006 |
| | C = −7.412e−008 | D = 0.000e+000 | E = 0.000e+000 | |
| 14 | 1/R = −4.272e−002 | k = −4.447e−001 | A = 3.472e−006 | B = −7.569e−007 |
| | C = −3.228e−008 | D = 0.000e+000 | E = 0.000e+000 | |
| 20 | 1/R = 3.846e−002 | k = 1.048e+000 | A = −4.988e−005 | B = −2.059e−006 |
| | C = 1.650e−007 | D = −3.617e−009 | E = 0.000e+000 | |

Second Numerical Example f: 6.0 mm~58.0 mm FNO: 2.86~5.88 ω: 31.08°~3.59°

|    | R | D | N | v |
|----|---|---|---|---|
| 1 | 26.981 | 1.20 | 1.847 | 23.8 |
| 2 | 13.994 | 0.85 | 1.633 | 23.0 |
| 3 | 15.658 | 4.60 | 1.835 | 42.7 |
| 4 | 358.862 | (variable) | | |

-continued

| | | | | |
|---|---|---|---|---|
| 5 | −159.873 | 0.95 | 1.883 | 40.8 |
| 6 | 9.909 | 2.76 | | |
| 7 | inf. | 11.50 | 2.003 | 28.3 |
| 8 | inf. | (variable) | | |
| 9 | (aspherical) | 1.35 | 1.689 | 31.1 |
| 10 | (aspherical) | 1.03 | | |
| 11 | 22.006 | 1.85 | 1.923 | 18.9 |
| 12 | −166.382 | (variable) | | |
| 13 | (aspherical) | 2.41 | 1.487 | 70.2 |
| 14 | (aspherical) | 0.10 | | |
| 15 | 6.707 | 4.03 | 1.487 | 70.2 |
| 16 | 16.157 | 0.60 | 2.003 | 28.3 |
| 17 | 5.547 | 0.76 | | |
| 18 | 105.785 | 1.29 | 1.487 | 70.2 |
| 19 | −63.687 | (variable) | | |
| 20 | (aspherical) | 2.33 | 1.487 | 70.2 |
| 21 | (aspherical) | (variable) | | |
| 22 | inf. | 0.60 | 1.516 | 64.1 |
| 23 | inf. | 0.80 | | |
| 24 | inf. | 0.40 | 1.516 | 64.1 |
| 25 | inf. | | | |

Distance Data

| | W | T |
|---|---|---|
| d4 | 1.01 | 14.01 |
| d8 | 0.94 | 0.94 |
| d12 | 28.47 | 2.41 |
| d19 | 4.50 | 35.00 |
| d21 | 6.10 | 1.52 |

Aspherical Surface Data

| | | | | |
|---|---|---|---|---|
| 9 | 1/R = −2.001e−002 | k = −6.781e+001 | A = 1.055e−004 | B = 1.266e−006 |
| | C = −5.605e−008 | D = 1.241e−009 | E = 0.000e+000 | |
| 10 | 1/R = 6.218e−002 | k = 9.316e−001 | A = 4.714e−005 | B = −5.188e−007 |
| | C = −3.884e−008 | D = 1.207e−009 | E = 0.000e+000 | |
| 13 | 1/R = 8.271e−002 | k = 1.428e+000 | A = −2.303e−004 | B = −1.645e−006 |
| | C = −4.913e−008 | D = 0.000e+000 | E = 0.000e+000 | |
| 14 | 1/R = −4.334e−002 | k = −1.077e+000 | A = 9.826e−006 | B = −8.672e−007 |
| | C = −1.478e−008 | D = 0.000e+000 | E = 0.000e+000 | |
| 20 | 1/R = 4.447e−002 | k = 2.567e+000 | A = 2.277e−005 | B = −1.548e−005 |
| | C = 1.133e−006 | D = −2.636e−008 | E = 0.000e+000 | |
| 21 | 1/R = −5.593e−002 | k = −3.884e+000 | A = 3.138e−005 | B = −1.273e−005 |
| | C = 9.820e−007 | D = −2.385e−008 | E = 0.000e+000 | |

Third Numerical Example f: 5.8 mm~56.0 mm FNO: 2.86~5.88 ω: 31.99°~3.72°

| | R | D | N | ν |
|---|---|---|---|---|
| 1 | 27.990 | 1.20 | 1.847 | 23.8 |
| 2 | 15.837 | 0.85 | 1.633 | 23.0 |
| 3 | 18.041 | 4.26 | 1.788 | 47.4 |
| 4 | 231.033 | (variable) | | |
| 5 | 77.135 | 0.95 | 1.883 | 40.8 |
| 6 | 9.042 | 3.12 | | |
| 7 | inf. | 11.50 | 2.003 | 28.3 |
| 8 | inf. | (variable) | | |
| 9 | (aspherical) | 1.35 | 1.519 | 61.8 |
| 10 | 14.923 | 0.41 | | |
| 11 | 17.179 | 1.48 | 1.923 | 18.9 |
| 12 | 57.741 | (variable) | | |
| 13 | (aspherical) | 2.09 | 1.487 | 70.2 |
| 14 | −26.251 | 0.10 | | |
| 15 | 5.976 | 3.17 | 1.487 | 70.2 |
| 16 | 12.524 | 0.60 | 2.003 | 28.3 |
| 17 | 5.090 | 2.35 | | |
| 18 | 12.521 | 1.26 | 1.487 | 70.2 |
| 19 | 99.032 | (variable) | | |
| 20 | (aspherical) | 2.08 | 1.487 | 70.2 |
| 21 | −25.000 | (variable) | | |
| 22 | inf. | 0.60 | 1.516 | 64.1 |
| 23 | inf. | 0.90 | | |

-continued

| | | | | |
|---|---|---|---|---|
| 24 | inf. | 0.40 | 1.516 | 64.1 |
| 25 | inf. | | | |

Distance Data

| | W | T |
|---|---|---|
| d4 | 0.65 | 19.25 |
| d8 | 3.47 | 0.94 |
| d12 | 21.51 | 2.41 |
| d19 | 4.60 | 30.50 |
| d21 | 5.82 | 1.50 |

Aspherical Surface Data

| | | | | |
|---|---|---|---|---|
| 9 | 1/R = −4.010e−002 | k = −5.546e+000 | A = 2.572e−005 | B = 1.584e−006 |
| | C = −6.156e−008 | D = 9.277e−010 | E = 0.000e+000 | |
| 13 | 1/R = 8.978e−002 | k = 1.482e+000 | A = −2.954e−004 | B = −1.968e−006 |
| | C = −5.262e−008 | D = 0.000e+000 | E = 0.000e+000 | |
| 20 | 1/R = 3.030e−002 | k = 2.719e+000 | A = −4.435e−005 | B = 2.324e−006 |
| | C = −5.389e−008 | D = 3.341e−010 | E = 0.000e+000 | |

Fourth Numerical Example f: 5.7 mm~54.9 mm FNO: 2.86~5.88 ω: 32.46°~3.80°

| | R | D | N | ν |
|---|---|---|---|---|
| 1 | 27.780 | 1.20 | 1.847 | 23.8 |
| 2 | 15.601 | 0.85 | 1.633 | 23.0 |
| 3 | 17.402 | 4.78 | 1.788 | 47.4 |
| 4 | 455.743 | (variable) | | |
| 5 | 83.268 | 0.95 | 1.883 | 40.8 |
| 6 | 8.327 | 3.31 | | |
| 7 | inf. | 11.50 | 2.003 | 28.3 |
| 8 | inf. | (variable) | | |
| 9 | (aspherical) | 1.35 | 1.519 | 61.8 |
| 10 | (aspherical) | 0.10 | | |
| 11 | 17.547 | 1.73 | 1.923 | 18.9 |
| 12 | 56.518 | (variable) | | |
| 13 | (aspherical) | 2.32 | 1.487 | 70.2 |
| 14 | −21.072 | 0.22 | | |
| 15 | 6.001 | 3.25 | 1.487 | 70.2 |
| 16 | 12.036 | 0.60 | 2.003 | 28.3 |
| 17 | 5.053 | (variable) | | |
| 18 | 11.713 | 1.23 | 1.487 | 70.2 |
| 19 | 32.283 | (variable) | | |
| 20 | (aspherical) | 2.10 | 1.487 | 70.2 |
| 21 | −39.076 | (variable) | | |
| 22 | inf. | 0.60 | 1.516 | 64.1 |
| 23 | inf. | 0.90 | | |
| 24 | inf. | 0.40 | 1.516 | 64.1 |
| 25 | inf. | | | |

Distance Data

| | W | T |
|---|---|---|
| d4 | 0.65 | 15.72 |
| d8 | 0.94 | 0.94 |
| d12 | 26.51 | 2.41 |
| d17 | 3.26 | 1.55 |
| d19 | 4.67 | 33.59 |
| d21 | 4.65 | 1.50 |

Aspherical Surface Data

| | | | | |
|---|---|---|---|---|
| 9 | 1/R = −3.591e−002 | k = −5.446e+000 | A = 2.543e−005 | B = 1.158e−006 |
| | C = −2.428e−009 | D = −5.332e−012 | E = 0.000e+000 | |
| 10 | 1/R = 5.617e−002 | k = 1.249e−001 | A = 1.292e−006 | B = 5.927e−007 |
| | C = 2.841e−009 | D = −1.130e−010 | E = 0.000e+000 | |
| 13 | 1/R = 8.422e−002 | k = 1.487e+000 | A = −2.772e−004 | B = −1.367e−006 |
| | C = −3.620e−008 | D = 0.000e+000 | E = 0.000e+000 | |
| 20 | 1/R = 4.334e−002 | k = 4.548e+000 | A = −3.973e−005 | B = 4.508e−006 |
| | C = −3.333e−007 | D = 7.606e−009 | E = 0.000e+000 | |

TABLE 1

| | Conditional Expression 1 | Conditional Expression 2 | Conditional Expression 3 | Conditional Expression 4 | Conditional Expression 5 | Conditional Expression 6 | Conditional Expression 7 | Conditional Expression 8 |
|---|---|---|---|---|---|---|---|---|
| First Numerical Example | 1.67 | 0.104 | 0.38 | 0.059 | 1.79 | 1.01 | 4.62 | 1.09 |
| Second Numerical Example | 1.63 | 0.116 | 0.39 | 0.066 | 1.83 | 0.88 | 4.61 | 1.10 |
| Third Numerical Example | 1.27 | 0.307 | 1.59 | 0.198 | 1.79 | 1.27 | 3.58 | 1.08 |
| Fourth Numerical Example | 1.81 | 0.198 | 1.19 | 0.118 | 1.79 | 1.22 | 4.52 | 1.19 |

The embodiments described above can provide a zoom lens that can be applied to a camera while allowing a small thickness of the camera and that can obtain a high zooming ratio and high optical performance over the entire zoom range.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-272053 filed Oct. 19, 2007, which is hereby incorporated by reference herein in its entirety.

What is claimed is:

1. A zoom lens comprising, from an object side to an image side:
   a first lens unit having a positive refractive power;
   a second lens unit having a negative refractive power and including a reflective member configured to fold an optical path;
   a third lens unit having a negative refractive power;
   an aperture stop; and
   a rear lens group having a positive refractive power as a whole and including at least one lens unit,
   wherein the second lens unit does not move and distances between the adjacent lens units change during zooming.

2. The zoom lens according to claim 1, wherein the following condition is satisfied:

$$0.75 < Zr/Zf < 3.00$$

where Zr represents a zooming ratio of the rear lens group, and Zf represents the sum of zooming ratios of the second and third lens units.

3. The zoom lens according to claim 1, wherein the following condition is satisfied:

$$0.05\sqrt{(fw \cdot ft)}/f3 < 0.70$$

where f3 represents a focal length of the third lens unit, and fw and ft respectively represent focal lengths of the entire zoom lens at a wide angle end and a telephoto end.

4. The zoom lens according to claim 1, wherein the following condition is satisfied:

$$0.3 < (1-\beta 3t^2) \cdot \beta rt^2 < 2.0$$

where $\beta 3t$ and $\beta rt$ respectively represent lateral magnifications of the third lens unit and the rear lens group at a telephoto end.

5. The zoom lens according to claim 1, wherein the following condition is satisfied:

$$0.007 < f2/f3 < 0.900$$

where f2 and f3 respectively represent focal lengths of the second and third lens units.

6. The zoom lens according to claim 1, wherein the following condition is satisfied:

$$1.61 < N1p < 1.90$$

where the first lens unit includes at least one positive lens, and $N1p$ represents the highest refractive index of a material of the at least one positive lens.

7. The zoom lens according to claim 1, wherein the following condition is satisfied:

$$0.5 < (r1+r2)/(r1-r2) < 1.5$$

where the second lens unit includes a negative lens, and r1 and r2 respectively represent radii of curvature of an object-side surface and an image-side surface of the negative lens.

8. The zoom lens according to claim 1, wherein the following condition is satisfied:

$$0 < Ls/fw < 7$$

where Ls represents a distance from a vertex of a surface of the third lens unit closest to the image side to the aperture stop at a wide angle end, and fw represents a focal length of the entire zoom lens at the wide angle end.

9. The zoom lens according to claim 1, wherein the following condition is satisfied:

$$0 < L1/fw < 2$$

where fw represents a focal length of the entire zoom lens at a wide angle end, and L1 represents a block thickness of the first lens unit.

10. The zoom lens according to claim 1, wherein the second lens unit includes, from the object side to the image side, a negative lens having a concave surface on the image side, and a reflective member.

11. The zoom lens according to claim 1, wherein the rear lens group includes, from the object side to the image side, a fourth lens unit having a positive refractive power and a fifth lens unit having a positive refractive power.

12. The zoom lens according to claim 1, wherein the rear lens group includes, from the object side to the image side, a fourth lens unit having a positive refractive power, a fifth lens unit having a positive refractive power, and a sixth lens unit having a positive refractive power.

13. An image pickup apparatus comprising:
   a zoom lens; and
   a solid-state image pickup element configured to receive an optical image formed by the zoom lens,
   wherein the zoom lens comprises, from an object side to an image side, a first lens unit having a positive refractive power;
a second lens unit having a negative refractive power and including a reflective member configured to fold an optical path;
a third lens unit having a negative refractive power;
an aperture stop; and
a rear lens group having a positive refractive power as a whole and including at least one lens unit,
wherein the second lens unit does not move and distances between the adjacent lens units change during zooming.

* * * * *